(12) United States Patent
Koshiba

(10) Patent No.: US 7,830,427 B2
(45) Date of Patent: Nov. 9, 2010

(54) SOLID-STATE IMAGE PICKUP ELEMENT AND IMAGE PICKUP DEVICE

(75) Inventor: Masaaki Koshiba, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 960 days.

(21) Appl. No.: 11/406,425

(22) Filed: Apr. 19, 2006

(65) Prior Publication Data

US 2006/0250509 A1 Nov. 9, 2006

(30) Foreign Application Priority Data

Apr. 21, 2005 (JP) .............................. 2005-123883

(51) Int. Cl.
*H04N 9/04* (2006.01)
(52) U.S. Cl. ...................... 348/272; 348/246; 348/350; 348/241; 348/243
(58) Field of Classification Search ................ 348/272, 348/340, 246, 247, 350, 241, 243
See application file for complete search history.

(56) References Cited

U.S. PATENT DOCUMENTS

| | | | |
|---|---|---|---|
| 6,707,495 B1* | 3/2004 | Harada | 348/302 |
| 7,034,873 B2* | 4/2006 | Mendis et al. | 348/246 |
| 7,057,657 B1* | 6/2006 | Ishihara et al. | 348/312 |
| 2003/0214594 A1* | 11/2003 | Bezryadin | 348/280 |
| 2005/0035377 A1* | 2/2005 | Kamimura et al. | 257/231 |
| 2005/0073597 A1* | 4/2005 | Rengakuji et al. | 348/241 |

FOREIGN PATENT DOCUMENTS

| | | |
|---|---|---|
| JP | 08-223356 A | 8/1996 |
| JP | 2001-169191 A | 6/2001 |
| JP | A 2002-198508 | 7/2002 |
| JP | A 2004-112723 | 4/2004 |

\* cited by examiner

*Primary Examiner*—Jason Chan
*Assistant Examiner*—Yih-Sien Kao
(74) *Attorney, Agent, or Firm*—Chad M. Herring; Sheldon J. Moss

(57) ABSTRACT

A solid-state image pickup element is disclosed which includes: a semiconductor substrate at which a plurality of element rows, in which a plurality of light-receiving elements are aligned along a vertical direction, are disposed in parallel along a horizontal direction; a plurality of color filters disposed in a predetermined color pattern at a light incident side of the semiconductor substrate; and a plurality of transfer paths transferring charge accumulated in the respective light-receiving elements of corresponding element rows. The sequence of lining-up in the horizontal direction of the element rows and the vertical transfer paths corresponding to the element rows at divisional regions, which are divided at a border line that runs along the vertical direction and includes a position corresponding to an optical axis of light incident from an optical unit on the semiconductor substrate, are opposite to one another. Also disclosed is an image pickup device using the solid-state image pickup element.

6 Claims, 10 Drawing Sheets

SOLID-STATE IMAGE PICKUP ELEMENT AND IMAGE PICKUP DEVICE

CROSS-REFERENCE TO RELATED APPLICATION

This application claims priority under 35 USC 119 from Japanese Patent Application No. 2005-123883, the disclosure of which is incorporated by reference herein.

TECHNICAL FIELD

The present invention relates to a solid-state image pickup element and to an image pickup device using the solid-state image pickup element. More particularly, the present invention relates to a solid-state image pickup element in which plural element rows, in which plural light-receiving elements which accumulate charges in accordance with amounts of received light are aligned along a predetermined direction, are disposed in parallel in an intersecting direction which intersects the predetermined direction, and the solid-state image pickup element has, at the light incident side thereof, a color filter having a predetermined color pattern. The present invention also relates to an image pickup device which carries out image pickup by using this solid-state image pickup element.

RELATED ART

Image pickup devices such as digital cameras and the like, which carry out photographing of a static image or a dynamic image by using a solid-state image pickup element such as a CCD (Charge Coupled Device) sensor or the like, have become increasingly popular in recent years. In this type of image pickup device, image signals expressing the image of the photographed subject are acquired by imaging light corresponding to the image of the photographed subject onto the light-receiving surface of the CCD sensor via an image pickup lens, and reading-out the charges which are accumulated in accordance with the light amounts received at the respective pixels of the CCD sensor.

At the CCD sensor, a plurality of element rows, in which plural light-receiving elements which accumulate charges in accordance with amount of received light are aligned along a predetermined direction, are disposed in parallel in an intersecting direction which intersects the predetermined direction. A color filter having a color pattern of, for example, red (R), green (G), and blue (B), is provided at the light incident side. Each of the light-receiving elements accumulates charges corresponding to the amount of light of one of the color components, and the accumulated charges are read-out via plural transfer paths which are provided between the respective element rows. The transfer path is divided into plural regions, and an electrode is provided at each region. By successively applying voltage to the respective regions, the charges accumulated in the light-receiving elements can be read-out and transferred. Further, when light is received, noise is generated and smearing occurs. Therefore, light-blocking films are formed on the electrodes of the transfer paths such that the transfer paths are shaded. There is a technique of reversing the direction of transfer of the charges at each of the transfer paths and mitigating smearing, because smearing occurs at the transfer paths due to the light which passes through the light-blocking films when light of a large light amount is received on the CCD sensor. Moreover, there is another technique in which the electrodes which are provided on the vertical transfer paths are made to be single-layer structures such that convexity and concavity are eliminated, and the ability of the light-blocking films to block light is improved.

In recent years, image pickup devices have been made more compact and thinner, and the distance between the image pickup lens and the CCD sensor has become shorter. When the distance between the image pickup lens and the CCD sensor becomes short in this way, the angles of incidence of light at the respective light-receiving elements of the peripheral portions become large as compared to at the central portion of the light-receiving surface.

In a CCD sensor, when the angle of incidence of light becomes large, the light which is incident onto a light-receiving element enters, from the end portion of the light-blocking film, into the transfer path which is adjacent at the outer side of that light-receiving element, and smearing occurs. There are the problems that coloring may be caused in the picked-up image, and that the coloring caused by the smearing may differ at the peripheral portions of the picked-up image.

Namely, in the case of a structure in which, for example, the transfer paths for transferring charges accumulated in the respective light-receiving elements of the element rows of the CCD sensor are provided at the right sides of the element rows, if the distance between the image pickup lens and the CCD sensor becomes short and the angles of incidence of light at the peripheral portions become large, at the light-receiving elements of the peripheral portion of the right side of the light-receiving surface, the light which should be incident onto those light-receiving elements is instead incident on the transfer path which is adjacent at the right side of the light-receiving elements, and smearing thereby occurs. At the light-receiving elements of the peripheral portion of the left side of the light-receiving surface, the light which should be incident onto those light-receiving elements is instead incident on the transfer path which is adjacent at the left side of the light-receiving elements, and smearing thereby occurs. The transfer paths which are adjacent at the right sides are transfer paths for transferring the charges which are accumulated in the light-receiving elements themselves. The transfer paths which are adjacent at the left sides are transfer paths for transferring the charges which are accumulated in the light-receiving elements which are adjacent to the left. Therefore, there are cases in which the coloring differs on the left and the right sides of the picked-up image.

Note that the techniques described above cannot prevent differences in the coloring due to smearing at the peripheral portions of the picked-up image in a case in which the angles of incidence of light become large and smearing occurs at the light-receiving elements of the peripheral portions.

SUMMARY

The present invention has been made in order to overcome the above-described problems, and provides a solid-state image pickup element and image pickup device which can prevent different coloring from arising due to the occurrence of smearing at the peripheral portions of a picked-up image.

A first aspect of the present invention provides a solid-state image pickup element comprising: a substrate at which a plurality of element rows, in which a plurality of light-receiving elements which accumulate charges in accordance with light amounts of received light are aligned along a predetermined direction, are disposed in parallel in an intersecting direction which intersects the predetermined direction; a color filter provided at a light incident side on the substrate, and having a predetermined color pattern, and transmitting light of a color component with respect to each of the light-receiving elements; and a plurality of transfer paths disposed parallel in correspondence with the respective element rows, and transferring charges accumulated in the respective light-receiving elements of corresponding element rows, wherein orders of lining-up, in the intersecting direction, the element rows and the transfer paths corresponding to the element rows at divisional regions which are divided at a border line, which runs along the predetermined direction and includes a position corresponding to an optical axis of light incident from an image pickup lens on the substrate, are opposite to one another.

A second aspect of the present invention provides a solid-state image pickup element comprising: a substrate at which a plurality of element rows, in which a plurality of light-receiving elements which accumulate charges in accordance with light amounts of received light are aligned along a predetermined direction, are disposed in parallel in an intersecting direction which intersects the predetermined direction; a color filter provided at a light incident side on the substrate, and having a predetermined color pattern, and transmitting light of a color component with respect to each of the light-receiving elements; and a plurality of transfer paths disposed parallel in correspondence with the respective element rows, and transferring charges accumulated in the respective light-receiving elements of corresponding element rows, wherein orders of lining-up, in the intersecting direction, the element rows and the transfer paths corresponding to the element rows at divisional regions which are divided at a border line, which runs along the predetermined direction and includes a position corresponding to an optical axis of light incident from an image pickup lens on the substrate, are opposite to one another, positions of the light-receiving elements of the element rows are symmetrical with respect to the border line, the color pattern of the color filter is symmetrical with respect to the border line, and the solid-state image pickup element further comprises: a charge separating layer which electrically separates the divisional regions along the border line; and a transfer path which does not have the corresponding element row along the border line.

A third aspect of the present invention provides an image pickup device comprising: (A) a solid-state image pickup element having: a substrate at which a plurality of element rows, in which a plurality of light-receiving elements which accumulate charges in accordance with light amounts of received light are aligned along a predetermined direction, are disposed in parallel in an intersecting direction which intersects the predetermined direction; a color filter provided at a light incident side on the substrate, and having a predetermined color pattern, and transmitting light of a color component with respect to each of the light-receiving elements; and a plurality of transfer paths disposed parallel in correspondence with the respective element rows, and transferring charges accumulated in the respective light-receiving elements of corresponding element rows, wherein orders of lining-up, in the intersecting direction, the element rows and the transfer paths corresponding to the element rows at divisional regions which are divided at a border line, which runs along the predetermined direction and includes a position corresponding to an optical axis of light incident from an image pickup lens on the substrate, are opposite to one another, positions of the light-receiving elements of the element rows are symmetrical with respect to the border line, and the color pattern of the color filter is symmetrical with respect to the border line; (B) a generating unit generating image data on the basis of charge amounts of charges, of the respective light-receiving elements, transferred from the solid-state image pickup element; and (C) a complementing unit which supposes, on the border line, dummy light-receiving elements of a color corresponding to the color pattern of the color filter, and complements data of positions corresponding to the dummy light-receiving elements of an image expressed by the image data, on the basis of data of pixels which are symmetrical at both sides of the positions and which are a same color as a color made to correspond to the dummy light-receiving elements.

A fourth aspect of the present invention provides an image pickup device comprising: (A) a solid-state image pickup element having: a substrate at which a plurality of element rows, in which a plurality of light-receiving elements which accumulate charges in accordance with light amounts of received light are aligned along a predetermined direction, are disposed in parallel in an intersecting direction which intersects the predetermined direction; a color filter provided at a light incident side on the substrate, and having a predetermined color pattern, and transmitting light of a color component with respect to each of the light-receiving elements; and a plurality of transfer paths disposed parallel in correspondence with the respective element rows, and transferring charges accumulated in the respective light-receiving elements of corresponding element rows, wherein orders of lining-up, in the intersecting direction, the element rows and the transfer paths corresponding to the element rows at divisional regions which are divided at a border line, which runs along the predetermined direction and includes a position corresponding to an optical axis of light incident from an image pickup lens on the substrate, are opposite to one another, and the solid-state image pickup element further has a transfer path which does not have the corresponding element row along the border line; (B) a generating unit generating image data on the basis of charge amounts of charges, of the respective light-receiving elements, transferred from the solid-state image pickup element; and (C) a correcting unit carrying out correction which removes noise from the image data, on the basis of a charge amount of charges obtained from the transfer path which does not have the corresponding element row.

Other aspects, features and advantages of the present invention will become apparent from the following description taken in conjunction with the accompanying drawings.

BRIEF DESCRIPTION OF THE DRAWINGS

Preferred embodiments of the present invention will be described in detail based on the following figures, in which.

DETAILED DESCRIPTION

Embodiments of the present invention will be described in detail hereinafter with reference to the drawings.

First Embodiment

Figure 1:
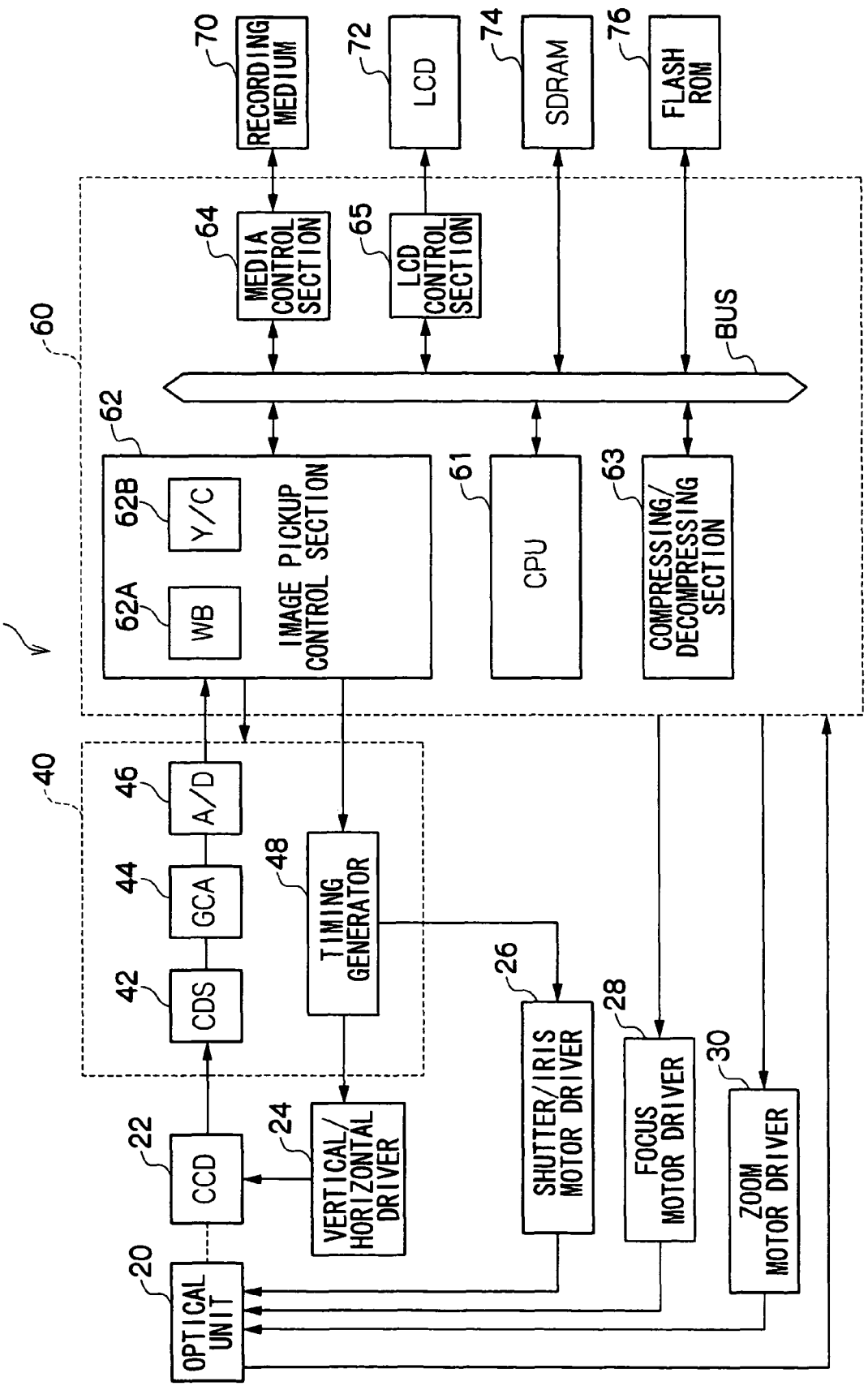
FIG. 1 is a block diagram showing the main structure of a digital camera relating to a first embodiment.

The schematic structure of a digital camera 10 relating to the present embodiment is as shown in FIG. 1. The digital camera 10 is structured so as to include: an optical unit 20 structured to include a lens for imaging an image of a photographed subject; a CCD 22 disposed at the rear side of the optical axis of the lens; a signal processing section 40 which, on the basis of output signals from the CCD 22, generates digital image data expressing the image of the photographed subject, and generates timing signals for driving the respective portions of the optical unit 20, and the CCD 22, and the like; a main control section 60 governing the overall operation of the digital camera 10; a vertical/horizontal driver 24 driving the CCD 22; a shutter/iris motor driver 26 driving shutter and diaphragm mechanisms included in the optical unit 20; a focus motor driver 28 driving a focal point adjusting motor included in the optical unit 20; and a zoom motor driver 30 driving a zoom motor included in the optical unit 20.

Note that the signal processing section 40 and the main control section 60 are structured as a single chip LSI (Large Scale Integrated circuit). The digital camera 10 can thereby be made to be more compact, more reliable, and at a lower cost.

The digital camera 10 is constituted including a liquid crystal display (LCD) 72, which displays various types of information and the image of the photographed subject obtained by image pickup by the CCD 22; an SDRAM (Synchronous Dynamic RAM) 74 mainly storing digital image data obtained by image pickup by the CCD 22; and a flash ROM 76 storing various types of parameters and programs and the like.

The main control section 60 is constituted by a CPU (Central Processing Unit) 61 which governs the overall operation of the main control section 60; an image pickup control section 62 incorporating therein a line buffer of a predetermined capacity, and structured to include a white balance adjusting circuit (WB) 62A which adjusts fluctuations in the white balance, and a Y/C converting circuit (Y/C) 62B which converts RGB data into YC signals; a compressing/decompressing section 63 carrying out compression processing in a predetermined compression format on picked-up digital image data, and carrying out decompression processing on the digital image data subjected to the compression processing; a media control section 64; and an LCD control section 65, being connected to one another via a bus BUS.

At the digital camera 10, it is possible to switch between a static image photographing mode and a dynamic image photographing mode by switching a mode switching switch (not shown). The compressing/decompressing section 63 carries out compression processing and decompression processing in a predetermined static image compression format (in the present embodiment, JPEG (Joint Photographic Coding Expert Group) format) on digital image data photographed in the static image photographing mode, and carries out compression processing and decompression processing in a predetermined dynamic image compression format (in the present embodiment, MPEG (Moving Picture Expert Group) -2) on digital image data photographed in the static image photographing mode.

The media control section 64 is connected to a portable storage medium 70. The writing of various types of information to the storage medium 70 and the reading of various types of information written in the storage medium 70 are controlled by the medium control section 64. Note that, in the digital camera 10 relating to the present embodiment, a SmartMedia® is used as the storage medium 70.

The LCD 72 is connected to the LCD control section 65. Various types of information are displayed on the LCD 72 under the control of the LCD control section 65. Note that the LCD 72 can display dynamic images (through images) obtained by continuous image pickup by the CCD 22, and be used as a finder.

The SDRAM 74 and the flash ROM 76 are connected to the bus BUS of the main control section 60. Accordingly, the CPU 61 can, as occasion demands, access the various types of data which are stored in the SDRAM 74 and the flash ROM 76.

On the other hand, the signal processing section 40 is structured to include a correlated double sampling circuit (CDS) 42, a gain control amplifier (GCA) 44, an A/D converter 46, and a timing generator 48.

The output end of the CCD 22 is connected to the image pickup control section 62 via the CDS 42, the GCA 44, and the A/D converter 46 in that order. The signal outputted from the CCD 22 is subjected to correlated double sampling processing by the CDS 42, is subjected to a predetermined sensitivity adjusting processing for each of the R (red), G (green), and B (blue) at the CCD 22 by the GCA 44, and thereafter, is outputted to the A/D converter 46 as R, G, B signals of the respective pixels. The A/D converter 46 converts the R, G, B signals, which are successively outputted from the GCA 44, into digital signals (hereinafter called "digital image data") of predetermined numbers of bits respectively, and outputs the digital image data to the image pickup control section 62.

The image pickup control section 62 accumulates the digital image data, which is successively inputted from the A/D converter 46, in a line buffer which is incorporated in the image pickup control section 62, and stores the digital image data in the SDRAM 74 once.

The digital image data which is stored in the SDRAM 74 is read-out by the WB 62A under the control of the CPU 61. The WB 62A carries out white balance adjustment by multiplying the digital image data by a digital gain which corresponds to the type of the light source, and carries out gamma processing and sharpness processing, so as to generate predetermined digital image data. Further, YC signal processing is carried out at the Y/C 62B so as to generate a luminance signal Y and chroma signals Cr, Cb (hereinafter called "YC signals"), and the YC signals are again stored in the SDRAM 74.

In a case in which the LCD 72 is used as a finder, the generated YC signals are successively outputted to the LCD control section 65, and through images are displayed on the LCD 72.

At the digital camera 10, when the static image photographing mode is selected and a shutter button (not shown) is pushed and operated by the photographer, the YC signals stored in the SDRAM 74 are compressed in a predetermined static image compression format at the compressing/decompressing section 63, and thereafter, are stored in the storage medium 70 via the media control section 64. On the other hand, when the dynamic image photographing mode is selected and the shutter button (not shown) is pushed and operated by the photographer, the YC signals stored in the SDRAM 74 are, as occasion demands, compressed in a predetermined dynamic image compression format at the compressing/decompressing section 63, and are stored in the storage medium 70, and recording of dynamic images is carried out. When the shutter button is pushed and operated again, the compression processing of the YC signals is stopped, and recording of the dynamic images is stopped.

On the other hand, the vertical/horizontal driver 24, the shutter/iris motor driver 26, and the image pickup control section 62 are connected to the timing generator 48.

The timing generator 48 is controlled by the image pickup control section 62. The timing generator 48 outputs, to the vertical/horizontal driver 24, timing signals for driving the CCD 22. Further, the timing generator 48 outputs, to the shutter/iris motor driver 26, timing signals for driving the mechanical shutter and diaphragm mechanisms provided at the optical unit 20.

The focus motor driver 28 and the zoom motor driver 30 are respectively connected to the main control section 60 (more specifically, to the CPU 61). The focus motor driver 28 is connected to the focal point adjusting motor provided at the optical unit 20, and the zoom motor driver 30 is connected to the zoom motor provided at the optical unit 20.

The lens which is included in the optical unit 20 relating to the present embodiment is structured as a zoom lens which has a plurality of lenses and which can change the focal length (change the magnification). The lens has a lens driving mechanism (not shown). The aforementioned zoom motor and focal point adjusting motor are included in the lens driving mechanism, and are driven respectively by driving signals supplied from the zoom motor driver 30 and the focus motor driver 28 under the control of the CPU 61.

When the optical zoom magnification is to be changed, the CPU 61 changes the focal length of the lens included in the optical unit 20, by driving and controlling the zoom motor via the zoom motor driver 30.

The CPU 61 carries out focus control by driving and controlling the focal point adjusting motor via the focus motor driver 28, such that the contrast of the image obtained by image pickup by the CCD 22 becomes a maximum. Namely, in the digital camera 10 relating to the present embodiment, a so-called TTL (Through The Lens) method, which sets the position of the lens such that the contrast of the read image becomes a maximum, is employed as the focus control. Focus control is carried out automatically due to the photographer depressing the shutter button (not shown) halfway in the state in which the subject of photographing is positioned at a predetermined position within a frame displayed on the LCD 72.

Figure 2:
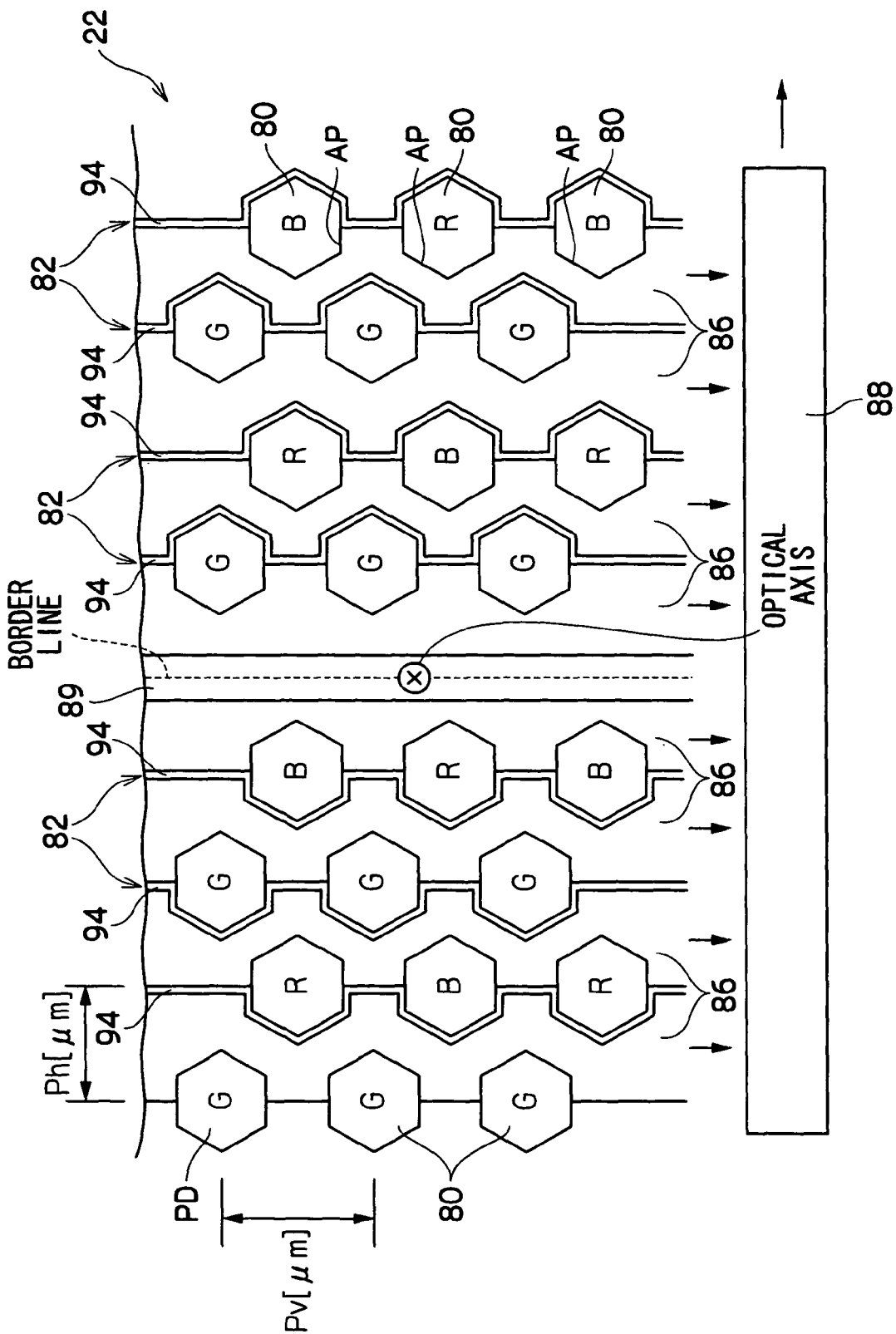
FIG. 2 is a plan view showing the structure of a CCD relating to the first embodiment.

The detailed structure of the CCD 22 relating to the present embodiment is shown in FIG. 2. Note that a honeycomb CCD, which is proposed by the applicant of the present invention, is employed as the CCD 22 relating to the present embodiment.

In the CCD 22, plural element rows 82, in which plural image-receiving elements 80 are aligned at a predetermined pitch (Pv (μm) in the present embodiment) along the vertical direction, are disposed in parallel at predetermined intervals (Ph (μm) in the present embodiment) in the horizontal direction which intersects the vertical direction. Note that, in the CCD 22 relating to the present embodiment, the light-receiving elements 80 of the element rows 82 which are adjacent to one another are offset by ½ of a pitch in the vertical direction, such that the light-receiving elements 80 are arranged in a so-called honeycomb form.

The CCD 22 has vertical transfer paths 86 and a horizontal transfer path 88. The vertical transfer paths 86 are disposed so as to detour around opening portions 85 which are formed in the front surfaces of the light-receiving elements 80, and take-out signals (charges) from the light-receiving elements 80 and transfer them in the vertical direction. The horizontal transfer path 88 is disposed at the vertical direction lower side of the vertical transfer paths 86, and transfers to the exterior the signals which are transferred from the vertical transfer paths 86. For each of the element rows 82, the vertical transfer path 86 corresponds to the element row 82 at the side, in the horizontal direction, opposite the side at which the optical axis of the received light is located, and is adjacent to that element row 82. The vertical transfer path 86 reads-out the charges accumulated in the respective light-receiving elements 80 of the adjacent element row 82, and transfers the charges. A pixel separating layer 94 is provided between the vertical transfer path 86 and the element row 82 at the optical axis side thereof, so as to electrically separate the two.

A central separating layer 89 is provided at the CCD 22. The central separating layer 89 electrically insulates and separates the vertical transfer paths 86 which are adjacent to one another along a border line which runs along the vertical direction and includes a position corresponding to the optical axis of the light incident from the optical unit 20. Accordingly, the CCD 22 relating to the present embodiment is structured such that the order in which the element row 82, the pixel separating layer 94, and the vertical transfer path 86 are lined-up is symmetrical with respect to the border line.

Figure 3:
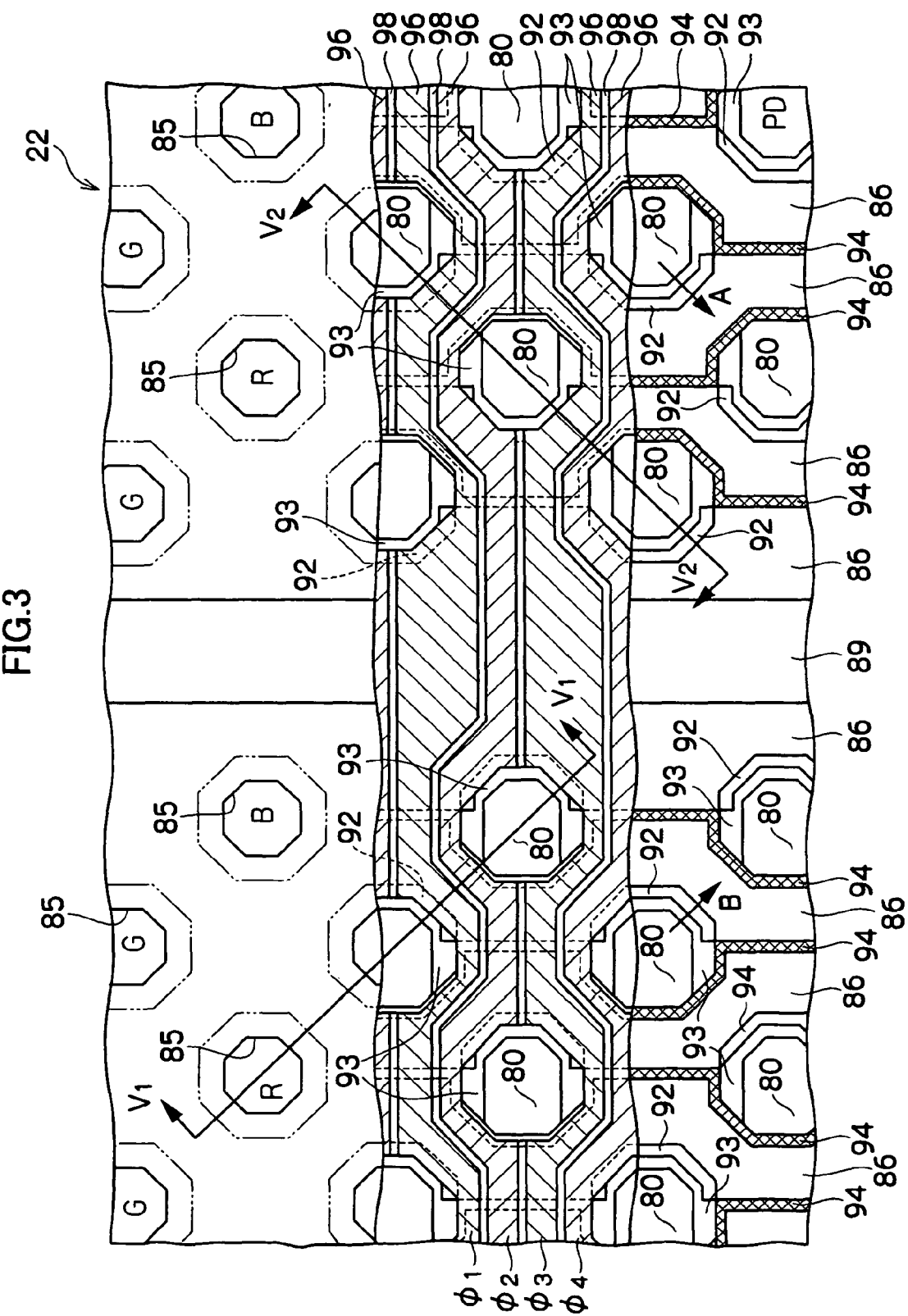
FIG. 3 is a partial enlarged plan view of an image pickup section of the CCD relating to the first embodiment.
Figures 4A, 4B:
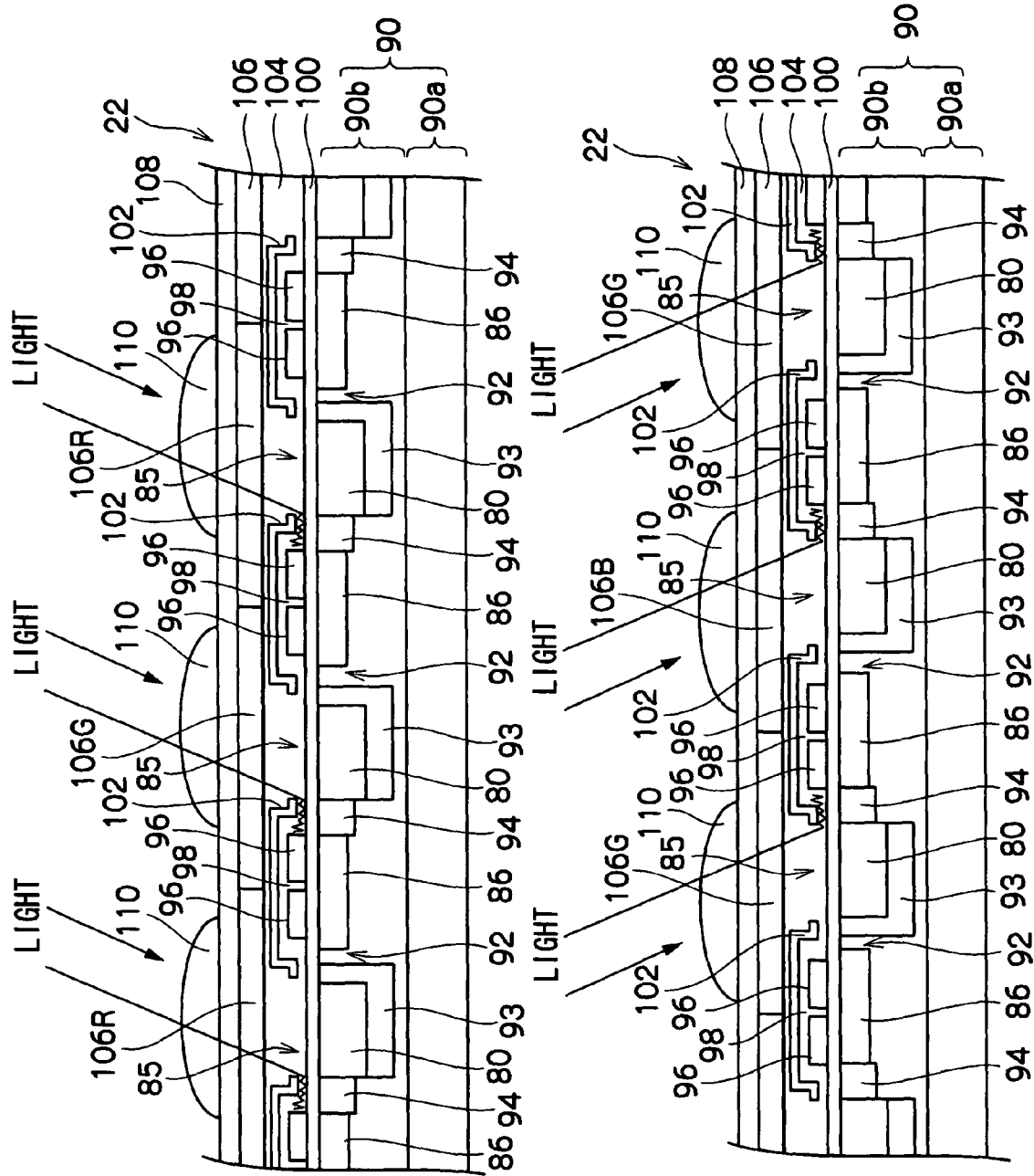
FIG. 4A is a cross-sectional view taken along line V1-V1, of the CCD of FIG. 3.
FIG. 4B is a cross-sectional view taken along line V2-V2, of the CCD of FIG. 3.

FIG. 3 is a partial enlarged diagram showing the structure of the CCD 22 relating to the present embodiment, with the microlenses and the color filter and the like removed. FIG. 4A is a cross-sectional view which is taken along line V1-V1 of FIG. 3, and to which the microlenses and the color filter and the like are added. FIG. 4B is a cross-sectional view which is taken along line V2-V2 of FIG. 3, and to which the microlenses and the color filter and the like are added.

As shown in FIGS. 3, 4A and 4B, the CCD 22 utilizes a semiconductor substrate 90 as the substrate. The semiconductor substrate 90 is constituted in the main from an n type semiconductor substrate 90*a* of silicon or the like, and a p type impurity-added region (p-wall) 90*b*. The CCD 22 is formed by embedded-type photodiodes being embedded into the p type impurity-added region 90*b* as the light-receiving elements 80.

The vertical transfer paths 86 are formed as n type impurity-added regions within the p type impurity-added region 90*b*. Channels 92 for read-out gates are provided between the vertical transfer paths 86 and the light-receiving elements 80 which are at the sides at which the signal charges are read-out by the vertical transfer paths 86. The pixel separating layers 94, which are p+ type impurity-added regions, are provided between the vertical transfer paths 86 and the other light-receiving elements 80 as described above. Due to the pixel separating layers 94, the light-receiving elements 80 and the vertical transfer paths 86 are electrically separated, and the vertical transfer paths 86 as well are separated from one another so as to not contact one another.

On the other hand, at the surface of the semiconductor substrate 90, n type impurity-added regions 93 are exposed along the channels 92 for read-out gates. The signal charges which are generated at the light-receiving elements 80 are temporarily stored in the n type impurity-added region 93, and thereafter, are read-out by the adjacent vertical transfer path 86 via the channel 92 for a read-out gate. Note that, as shown in FIGS. 4A and 4B, the CCD 22 relating to the present embodiment is structured such that the order in which the light-receiving elements 80, the n-type impurity-added region 93, the channel 92 for a read-out gate, the vertical transfer path 86, and the pixel separating layer 94 are lined-up, is symmetrical with respect to the central separating layer 89. Therefore, at the region at the right side of the central separating layer 89, the charges accumulated in the n type impurity-added region 93 are read-out by the left-side vertical transfer path 86 which is adjacent in the direction of arrow A in FIG. 3, whereas at the region at the left side of the central separating layer 89, the charges accumulated in the n type impurity-added region 93 are read-out by the right-side vertical transfer path 86 which is adjacent in the direction of arrow B in FIG. 3.

Transfer electrodes 96 (see FIGS. 4A and 4B), which extend in the horizontal direction so as to pass through between the photodiodes, are formed at the surface of the semiconductor substrate 90, at the surfaces of the vertical transfer paths 86. The signal charges are transferred from the channels 92 for read-out gates which are beneath the electrodes to which a read-out signal is applied, among the transfer electrodes 96.

Plural groups of the transfer electrodes 96 are aligned in the vertical direction, with each one group being four of the transfer electrodes 96 which drive at different phases with respect to each light-receiving element 80. Voltages whose phases are different are successively applied to the four transfer electrodes 96 from the vertical/horizontal driver 24 on the basis of timing signals from the timing generator 48, such that four-phase driving ($\phi$1 to $\phi$4) is carried out, and the charges generated at the light-receiving element 80 are transferred in the vertical direction. The respective transfer electrodes 96 which are driven at different phases are structured by single-layer electrodes which are formed in the same planar shape via narrow gaps (intervals in the direction in which the transfer electrodes are lined-up) 98.

The surface of the semiconductor substrate 90 at which the transfer electrodes 96 are formed is covered by a surface protecting film 100 (see FIGS. 4A and 4B) which is formed of a transparent resin or the like. Light-blocking films 102 are formed on the surface protecting film 100. The light-blocking film 102 has, for each of the light-receiving elements 80, the opening portion 85 which is octagonal for example, as a light transmitting portion which transmits the light which is received at the p+ type impurity-added region 90b which is the light-receiving region. The edge portions of the light-blocking films 102 extend in the directions of the centers of the light-receiving regions, and the shapes of the opening portions of the light-receiving elements 80 are demarcated by the light-blocking films 102.

A color filter 106 having red (R) filters 106R, green (G) filters 106G, and blue (B) filters 106B, is formed, via a planarizing film 104 formed of a transparent resin, on the light-blocking films 102 and the surface protecting film 100 which is exposed from the light-blocking films 102. At the R filters 106R, the G filters 106G, and the B filters 106B, the respective colors of RGB are disposed in a predetermined color pattern in accordance with the individual light-receiving elements 80. Further, a microlens array having a plurality of microlenses 110 is formed on the color filter 106 via a planarizing film 108. Note that, in FIGS. 2, 3, 6, 7, and 9, the opening portions 85 which are formed at the front surfaces of the light-receiving elements 80 marked "R" are covered by the R filters 106R, the opening portions 85 formed at the front surfaces of the light-receiving elements 80 marked "G" are covered by the G filters 106G, and the opening portions 85 formed at the front surfaces of the light-receiving elements 80 marked "B" are covered by the B filters 106B. The light-receiving elements 80 marked "R" receive red light, the light-receiving elements 80 marked "G" receive green light, and the light-receiving elements 80 marked "B" receive blue light.

Figure 5:
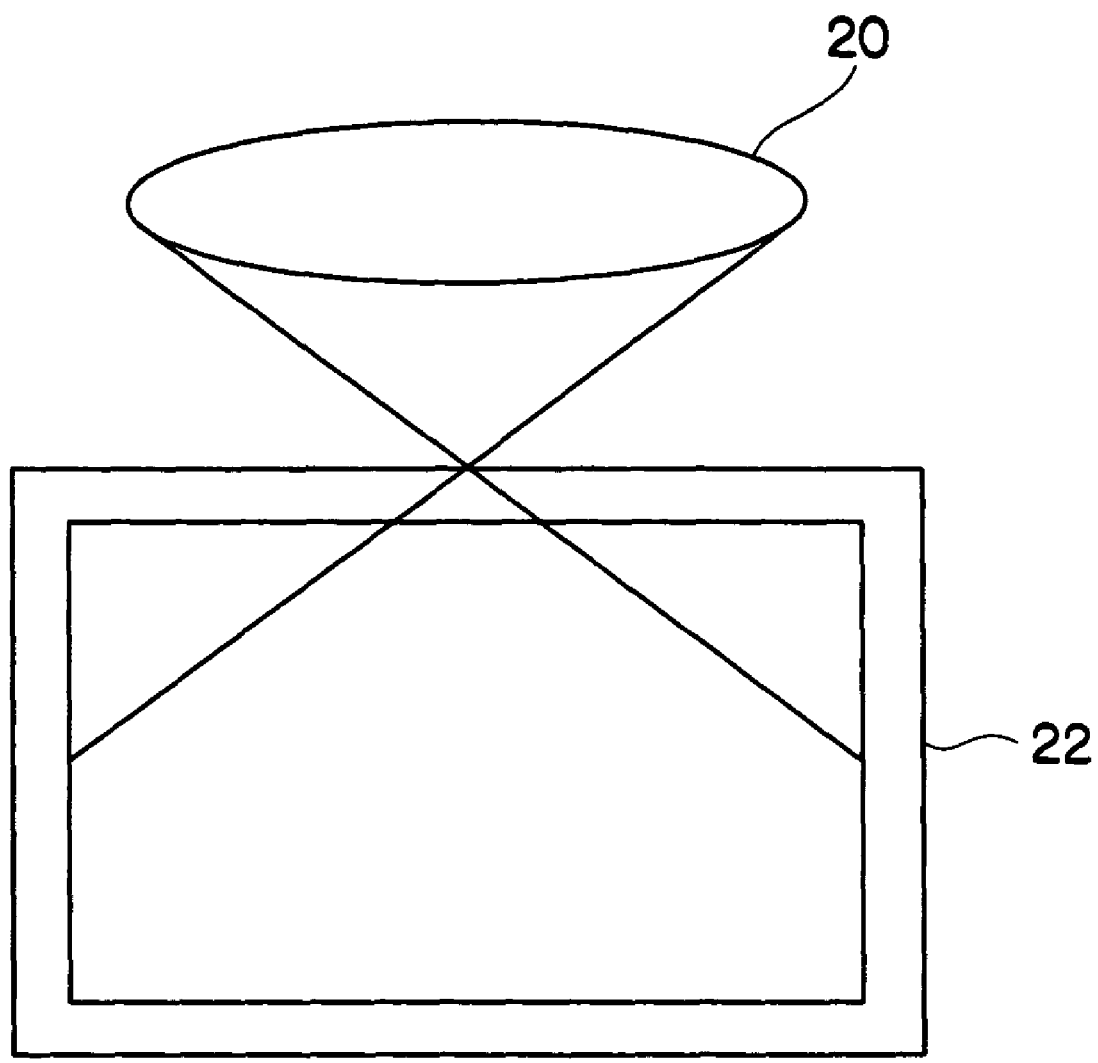
FIG. 5 is a diagram showing the positional relationship between the CCD and an optical unit relating to the first embodiment.

As shown in FIG. 5, when the digital camera 10 is made to be thinner and the distance between the optical unit 20 and the CCD 22 becomes short, the angles of incidence of light of the respective light-receiving elements 80 at the peripheral portions become large, as compared with at the central portion of the light-receiving surface of the CCD 22. When the angles of incidence of light become large, as shown in FIGS. 4A and 4B, light enters, from the end portions of the light-blocking films 102, into the transfer paths which are adjacent at the outer sides of the light-receiving elements, and smearing occurs.

However, as described above, the CCD 22 relating to the present embodiment is structured such that the order in which the element rows 82 and the vertical transfer paths 86 are lined-up is symmetrical with respect to the border line. In this way, at the light-receiving elements 80 at the peripheral portion at the right side of the light-receiving surface, smearing occurs at the right-side vertical transfer paths 86 which transfer the charges accumulated in the light-receiving elements 80 of the element rows 82 adjacent at the right, whereas, at the light-receiving elements 80 at the peripheral portion at the left side of the light-receiving surface, smearing occurs at the left-side vertical transfer paths 86 which transfer the charges accumulated in the light-receiving elements 80 of the element rows 82 adjacent at the left. Accordingly, because smearing can be caused at the vertical transfer paths 86 of adjacent element rows 82, the occurrence of different coloring at the peripheral portions of the picked-up image can be prevented.

Further, the central separating layer 89 is provided at the CCD 22 relating to the present embodiment. Therefore, even in a case in which, for example, a bright spot is illuminated on the CCD 22 and the charges overflow to the surrounding pixels and blooming in which the image becomes white occurs, it can be stopped at the central separating layer 89. Note that, by providing the central separating layer 89, the width between the element rows 82 at the border line portion becomes large, but the effects on image quality can be suppressed by making the width of the central separating layer 89 small.

As described above in detail, the CCD 22 of the first embodiment has: a substrate (here, the semiconductor substrate 90) at which plural element rows, in which plural light-receiving elements which accumulate charges in accordance with the amount of received light are aligned along a predetermined direction (here, the vertical direction), are disposed in parallel in an intersecting direction (here, the horizontal direction) which intersects the predetermined direction; a color filter provided at a light incident side on the substrate, and having a predetermined color pattern, and transmitting light of a color component with respect to each of the light-receiving elements; and plural transfer paths (here, the vertical transfer paths 86) disposed parallel in correspondence with the respective element rows, and transferring charges accumulated in the respective light-receiving elements of corresponding element rows. The sequence of alignment in the intersecting direction of the element rows and the transfer paths corresponding to the element rows at divisional regions, which are divided at a border line that runs along the predetermined direction and includes a position corresponding to an optical axis of light incident from an image pickup lens (here, the optical unit 20) on the substrate, are opposite to one another. Thus, it is possible to prevent different coloring from arising due to the occurrence of smearing at the peripheral portions of the picked-up image.

Further, the CCD 22 of the first embodiment is further provided with a charge separating layer (here, the central separating layer 89) which electrically separates the divisional regions along the border line. Therefore, even if noise, such as smearing or blooming or the like, arises at one region, effects of the noise on the other region can be prevented.

Second Embodiment

The second embodiment describes a example of a case in which the positions of the vertical transfer paths 86 and the light-receiving elements 80 of the element rows 82 of the CCD 22, and the color pattern of the color filter 106, are symmetric with respect to the border line.

Figure 6:
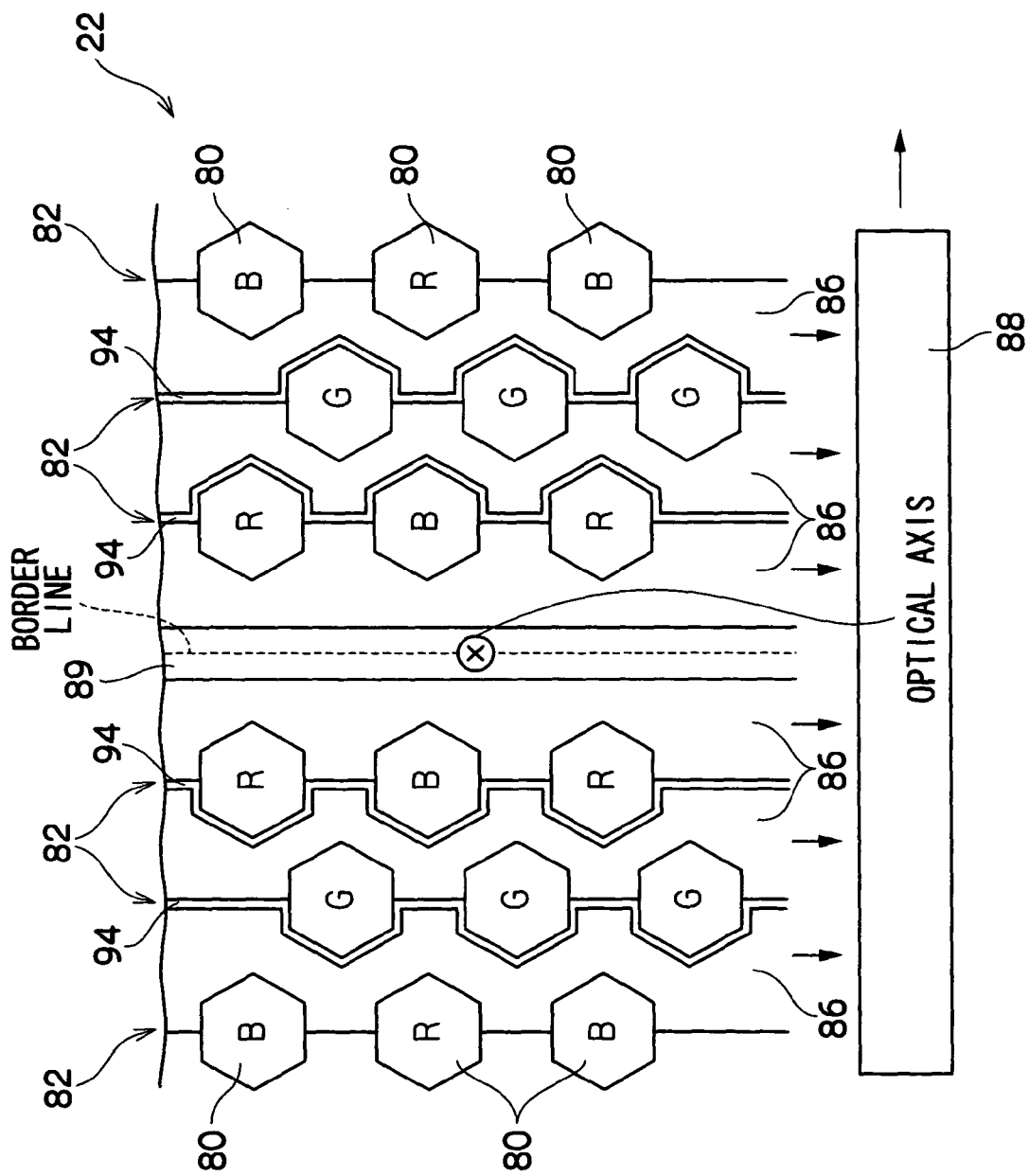
FIG. 6 is a plan view showing the structure of a CCD relating to a second embodiment.

The detailed structure of the CCD 22 relating to the second embodiment is shown in FIG. 6. Note that structural elements of FIG. 6 which are the same as those of FIG. 2 are denoted by the same reference numerals as in FIG. 2, and description thereof is omitted.

In the CCD 22 relating to the second embodiment, the positions of the respective light-receiving elements 80 of the element rows 82 and the vertical transfer paths 86 are symmetrical with respect to the central separating layer 89. The color pattern of the color filter 106 also is symmetrical with respect to the central separating layer 89.

By making the positions of the light-receiving elements 80 and the vertical transfer paths 86 symmetrical in this way, the angles of incidence of light at the light-receiving elements 80 of the left and right peripheral portions are the same, and therefore, smearing occurs at the same positions. Further, by making the color pattern of the color filter 106 symmetrical, differences in colors at the left and the right are eliminated. Thus, the occurrence of different coloring can be prevented.

The operation of the digital camera 10 relating to the present embodiment at the time of image pickup will be described next.

When a photographing standby state arises at the digital camera 10 and light is received on the light-receiving surface of the CCD 22 via the optical unit 20, photoelectric conversion is carried out at the light-receiving elements 80 of the CCD 22, and charges are accumulated in the respective light-receiving elements 80 in accordance with the light amounts of the received light.

When the photographing standby state arises, the timing generator 48 outputs, to the vertical/horizontal driver 24, timing signals which control the timing of reading-out the charges which are accumulated in the respective light-receiving elements 80 of the CCD 22.

The vertical/horizontal driver 24 successively applies voltages of different phases to the transfer electrodes 96 in accordance with the inputted timing signals so as to carry out four-phase driving (φ1 to φ4), and causes the signal charges generated at the light-receiving elements 80 to be transferred in the vertical direction. The accumulated charges are read-out via the horizontal transfer path 88, and are outputted as signals.

The signals outputted from the CCD 22 are subjected to correlated double sampling processing by the CDS 42 of the signal processing section 40, are subjected to a predetermined sensitivity adjusting processing for each of R (red), G (green) and B (blue) by the GCA 44, and are converted into digital image data by the A/D converter 46. The digital image data is outputted to the image pickup control section 62.

As shown in FIG. 6, by making the color pattern of the color filter 106 symmetrical, the data of the element row 82 corresponding to the position of the central separating layer 89 is left out.

Figure 7:
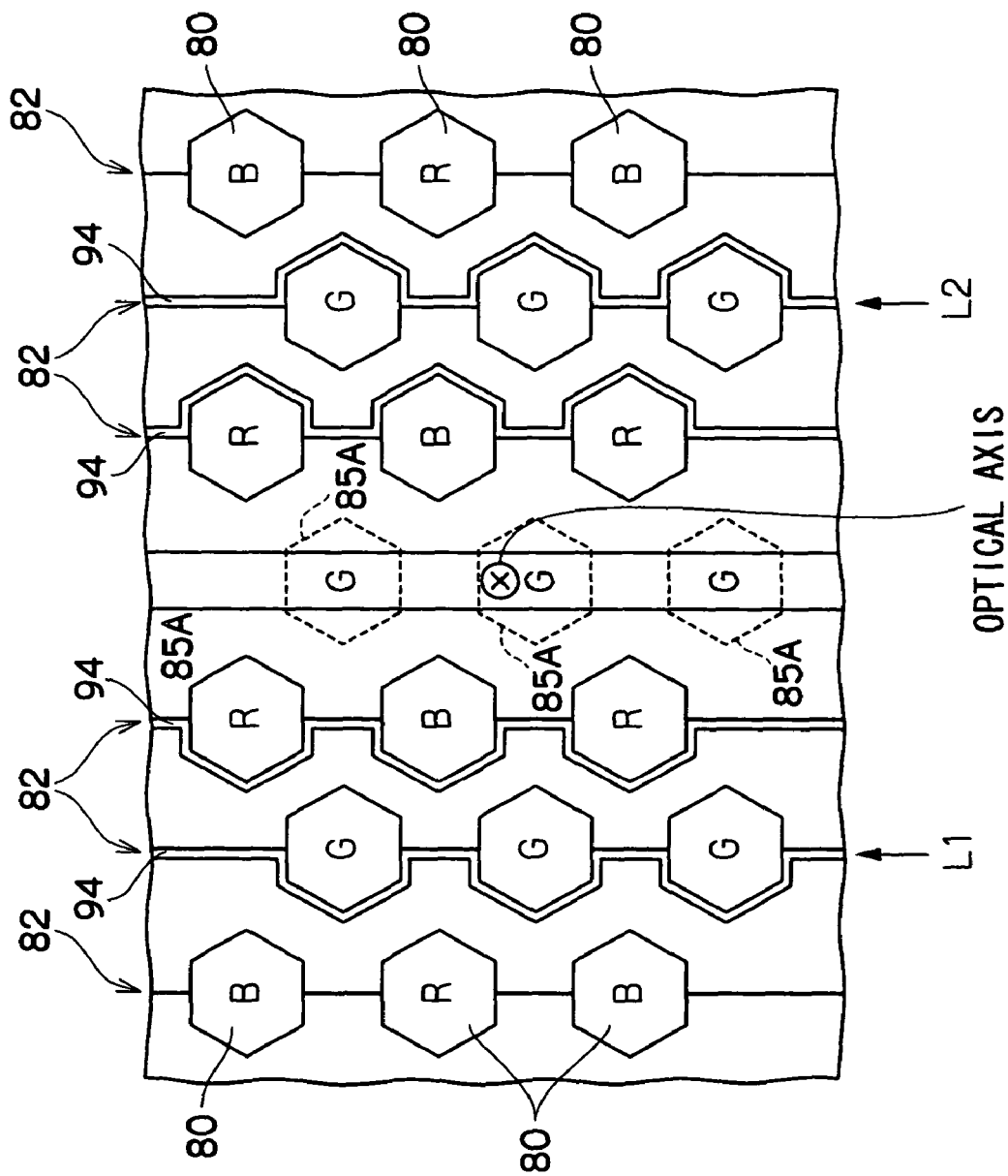
FIG. 7 is a plan view showing the positions of dummy light-receiving elements of the CCD relating to the second embodiment.

Thus, in the digital camera 10 relating to the present embodiment, at the image pickup control section 62, dummy light-receiving elements 80A are supposed on the central separating layer 89 as shown in FIG. 7, and complementing processing is carried out which complements the data of the positions corresponding to these dummy image-receiving elements 80A from the image expressed by the digital image data, on the basis of the data of the G color pixels which are symmetrical at the both sides of these positions and which are the same color as the dummy light-receiving elements. After the complementing, the digital image data is once stored in the SDRAM 74.

Operation of the digital camera 10 at the time when this complementing processing is carried out, will be described next with reference to FIG. 8. Note that FIG. 8 is a flowchart showing the flow of the complementing processing.

Figure 8:
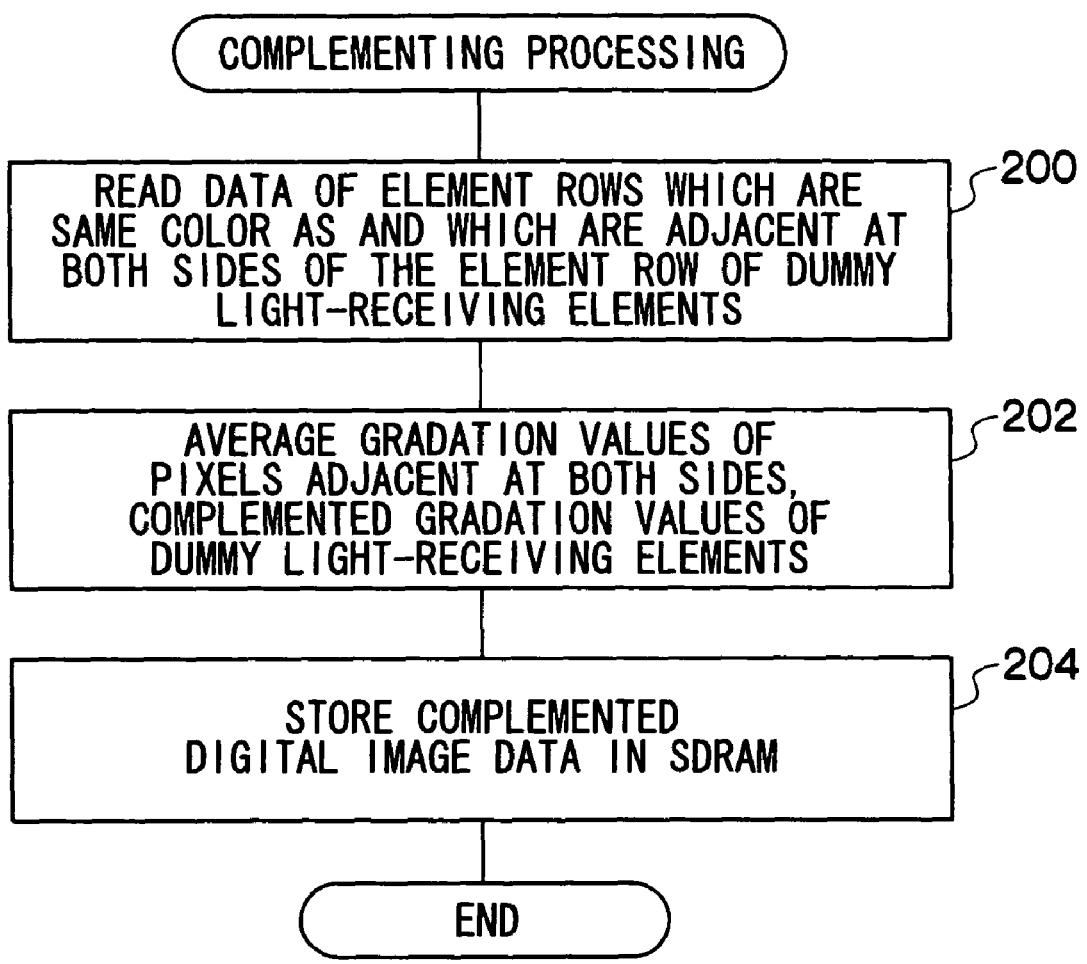
FIG. 8 is a flowchart showing the flow of complementing processing relating to the second embodiment.

In step 200 of FIG. 8, data (gradation values) of the element rows 82 which are the same color as and are adjacent at the both sides of the dummy light-receiving elements 80A, is read from the image which is expressed by the digital image data. Namely, data corresponding to the element rows 82 which are L1 and L2 in FIG. 7 is read.

In next step 202, on the basis of the read data of the element rows 82 of the same color which are adjacent at the both sides, the gradation values of the pixels which are adjacent at the both sides of each of the dummy light-receiving elements 80A are averaged, and data is complemented by using the average values as the gradation values of the pixels of the dummy light-receiving elements 80A.

In subsequent step 204, the complemented digital data is stored once in the SDRAM 74, and processing ends.

As described above in detail, in the CCD 22 of the second embodiment, the positions of the respective light-receiving elements of the element rows are symmetrical with respect to the border line. Therefore, the angles of incidence of light at the light-receiving elements 80 of the left and right peripheral portions are the same, and smearing occurs at the same positions. Thus, it is possible to prevent different coloring from arising due to the occurrence of smearing at the peripheral portions of the picked-up image.

Because the color pattern of the color filter is symmetrical with respect to the border line in the CCD 22 of the second embodiment, differences in colors at the divisional regions are eliminated. Therefore, different coloring can be prevented from arising.

Moreover, in the digital camera 10 of the second embodiment, image data is generated by a generating unit (here, the signal processing section 40) on the basis of charge amounts of charges, of the respective light-receiving elements, transferred from the solid-state image pickup element (the CCD 22). A complementing unit (the image pickup control section 62), supposes, on the border line, dummy light-receiving elements of a color corresponding to the color pattern of the color filter, and complements data of positions corresponding to the dummy light-receiving elements of an image expressed by the image data, on the basis of data of pixels which are symmetrical at both sides of the positions and which are a same color as a color made to correspond to the dummy light-receiving elements. Therefore, image quality can be prevented from deteriorating.

A case is described in which, in step 202 of the second embodiment, as the data of the respective dummy light-receiving elements 80A, the gradation values of the pixels which are adjacent at the both sides of the element rows 82 which are the same color as and which are adjacent at the both sides of the dummy light-receiving elements 80A are averaged. However, the present invention is not limited to the same. For example, the data of the respective dummy light-receiving elements 80A can be determined by prescribing plural element rows 82 of the same color as and at the both sides of the dummy light-receiving elements 80A, and taking the weighted average of the gradation values of the respective pixels along the horizontal direction in accordance with the distances from the positions of the dummy light-receiving elements 80A.

Third Embodiment

In the third embodiment, explanation will be given of an example in which the vertical transfer paths 86 are structured so as to be adjacent to the element rows 82 at the optical axis sides thereof, and the orders of lining-up the element rows 82 and the transfer paths 86 corresponding to these element rows 82 at the regions divided by the border line, are opposite to one another.

Figure 9:
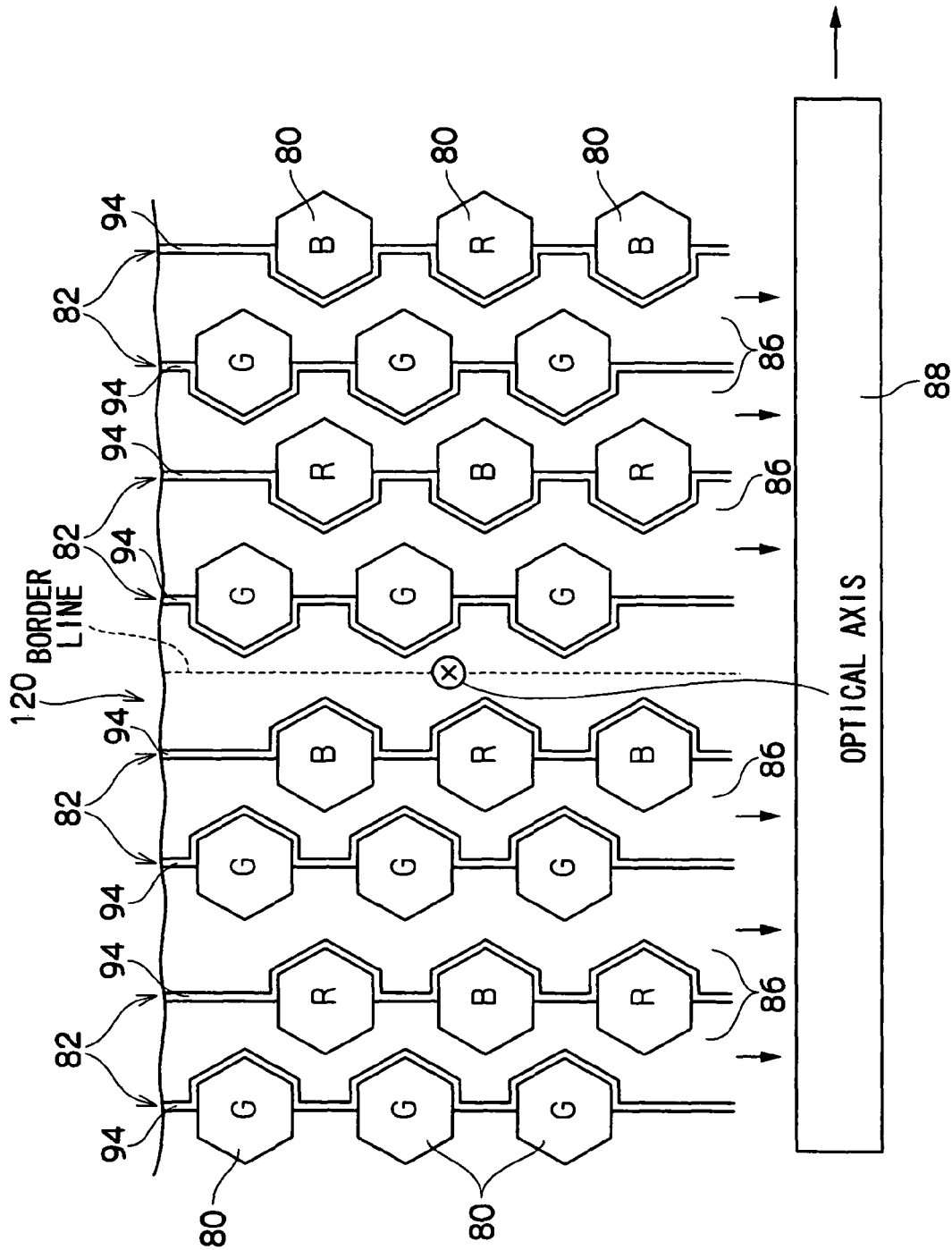
FIG. 9 is a plan view showing the structure of a CCD relating to a third embodiment.

The detailed structure of the CCD 22 relating to the third embodiment is shown in FIG. 9. Note that structural elements of FIG. 9 which are the same as those of FIG. 2 are denoted by the same reference numerals as in FIG. 2, and description thereof is omitted.

In the CCD 22 relating to the third embodiment, each vertical transfer path 86 corresponds to the element row 82 which is, with respect to that vertical transfer path 86 and in the horizontal direction, at the side of the optical axis of the received light, and the vertical transfer path 86 is adjacent to that element row 82. The pixel separating layer 94 is provided at the side of the vertical transfer path 86 opposite the optical axis side thereof, and electrically separates the two. Accordingly, in the CCD 22 relating to the present embodiment, the order in which the element row 82, the pixel separating layer 94, and the vertical transfer path 86 are lined-up is symmetrical with respect to the border line.

By utilizing a structure in which each of the vertical transfer paths 86 transfers the charges accumulated in the light-receiving elements 80 of the element row 82 which is adjacent at the side of the optical axis of the light, in a case in which the angles of incidence of the light at the peripheral portions of the light-receiving surface are large, at the light-receiving elements 80 of the peripheral portion at the right side of the light-receiving surface, smearing occurs at the right-side vertical transfer path 86 which transfers the charges accumulated in those light-receiving elements 80, and also at the light-receiving elements 80 of the peripheral portion of the left side of the light-receiving surface, smearing occurs at the left-side vertical transfer path 86 which transfers the charges accumulated in those light-receiving elements 80. Accordingly, because smearing can be made to occur at the vertical transfer paths 86 which transfer the charges accumulated in the light-receiving elements 80 themselves, the occurrence of coloring at the peripheral portions of the picked-up image can be prevented.

Further, a noise charge transfer path 120, which is of a similar structure as the vertical transfer path 86 but does not have a corresponding element row 82, is provided at the CCD 22 relating to the third embodiment along the border line which is set along the vertical direction at a position at which the optical axis of the received light passes through. The pixel separating layers 94 are provided at the both sides of the noise charge transfer path 120, such that the noise charge transfer path 120 is electrically separated from all of the element rows 82.

When the CCD 22 receives light of a large light amount, smearing arises at the respective vertical transfer paths 86 and the noise charge transfer path 120 due to the light which passes through the light-blocking films 102. Because the noise charge transfer path 120 is separated from all of the element rows 82, charges due to the occurrence of noise, such as smearing or the like, are accumulated thereat.

The signal processing section 40 extracts, from the signal outputted from the CCD 22, the signal due to the noise charge transfer path 120, and outputs it to the image pickup control section 62 as noise data.

At the image pickup control section 62, correction processing which removes the noise from the image data is carried out on the basis of this noise data, and the corrected digital image data is stored once in the SDRAM 74.

Operation of the digital camera 10 at the time of carrying out this correction processing will be described next with reference to FIG. 10. Note that FIG. 10 is a flowchart showing the flow of the correction processing.

Figure 10:
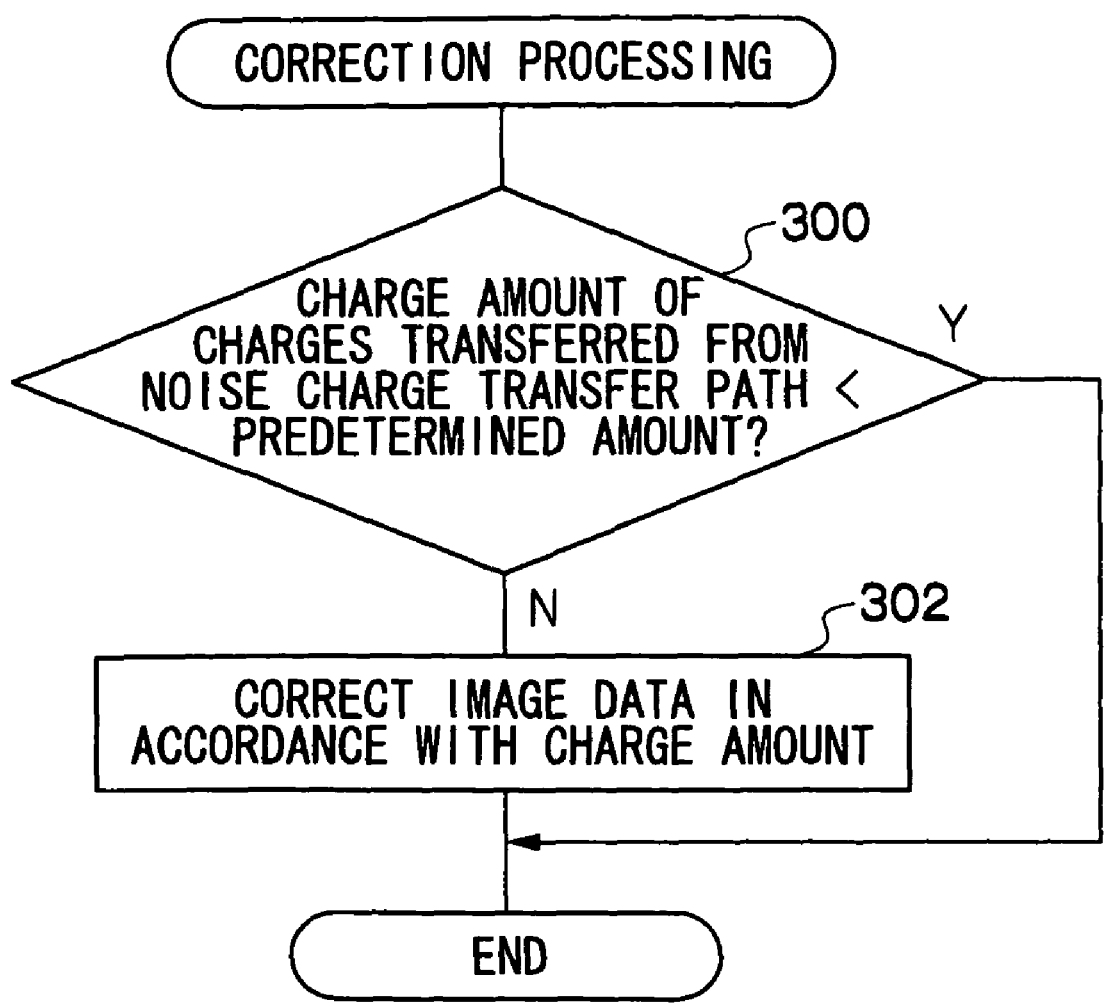
FIG. 10 is a flowchart showing the flow of correction processing relating to the third embodiment.

In step 300 of FIG. 10, it is judged whether or not the amount of charge accumulated in the noise charge transfer path 120, which is expressed by the noise data, is less than a predetermined amount. If the judgment is negative, the routine moves on to step 302, whereas if the judgment is affirmative, the processing ends.

Namely, if the charges accumulated in the noise charge transfer path 120 are made to be an image, in a case in which smearing such as in the form of white stripes arises, if correction based on that amount of charge is carried out, there will be excessive correction. Therefore, correction is carried out in a case in which the charges accumulated in the noise charge transfer path 120 are less than a predetermined value. Note that the predetermined amount is set to be an appropriate value by which it can be judged that smearing, such as in the form of white stripes, arises.

In step 302, to the extent that the amount of charge expressed by the noise data is large, correction of the gradation values of the entire image expressed by the image data is carried out so as to lower the luminance, and processing ends.

As described in detail above, because the CCD 22 of the third embodiment has the transfer path (here, the vertical transfer path 86) which does not have a corresponding element row along the border line, charges due to noise generated at the transfer path at the time of receiving light can be obtained.

Further, in the digital camera 10 of the third embodiment, a generating unit generates image data on the basis of charge amounts of charges, of the respective light-receiving elements, transferred from the solid-state image pickup element, and a correcting unit (here, the image pickup control section 62) carries out correction which removes noise from the image data, on the basis of a charge amount of charges obtained from the transfer path which does not have the corresponding element row. Consequently, the image quality of the picked-up image can be improved.

Description has been given of cases in which, in the CCDs 22 relating to the first embodiment and the second embodiment, the position of the vertical transfer path 86 is made to be adjacent to the element row 82 which is at the side, in the intersecting direction, opposite the side of the optical axis of the received light. However, the present invention is not limited thereto. For example, in the same way as in the CCD 22 relating to the third embodiment, the position of the vertical transfer path 86 may be made to be adjacent to the element row 82 at the side, in the intersecting direction, of the optical axis of the received light. Further, in the same way as the CCDs 22 relating to the first embodiment and the second embodiment, the CCD 22 relating to the third embodiment may be structured such that the position of the vertical transfer path 86 is adjacent to the element row 82 at the side, in the intersecting direction, which is opposite the side of the optical axis of the received light. Provided that the order in which the element rows 82 and the transfer paths 86 corresponding to those element rows 82 are lined-up in the intersecting direction is opposite at either side of the border line, it is possible to, regardless of the structure, prevent different coloring from arising due to the occurrence of smearing at the peripheral portions of the picked-up image.

Further, in the first embodiment and the second embodiment, description has been made of cases in which the central separating layer 89 is provided at the CCD 22, but the present invention is not limited thereto. For example, as in the third embodiment, the noise charge transfer path 120 may be provided, and correction which removes noise from the image data may be carried out. In this case as well, the image quality of the picked-up image can be improved.

In the third embodiment, a case is described in which the noise charge transfer path 120 is provided at the CCD 22. However, the present invention is not limited thereto. For example, as in the first embodiment and the second embodiment, the central separating layer 89 may be provided. In this case as well, even if noise such as smearing or blooming or the like arises at one region, effects of the noise on the other region can be prevented.

Although the color filter 106 of primary colors is used in the first embodiment through the third embodiment, the color filter 106 of complementary colors be used. Further, the arrangement of the colors may be any pattern.

The structures of the CCDs 22 and the structure of the digital camera 10 (see FIGS. 1 through 7 and FIG. 9) which are described in the first embodiment through the third embodiment are merely examples, and may of course be modified appropriately within a scope which does not deviate from the gist of the present invention.

Moreover, the flows of the complementing processing and the correction processing (see FIGS. 8 and 10) which are described in the second embodiment and the third embodiment are merely examples, and may of course be modified appropriately within a scope which does not deviate from the gist of the present invention.

What is claimed is:

1. A solid-state image pickup element, comprising:
   a substrate;
   a plurality of light-receiving elements aligned in rows along a predetermined direction in the substrate, the light-receiving elements accumulating charge in accordance with an amount of received light;
   a color filter provided at a light incident side of the substrate, the color filter having a predetermined color pattern, and transmitting light of a color component to each of the light-receiving elements;
   a plurality of transfer paths disposed adjacent to the rows of light-receiving elements and transferring charge accumulated by respective light-receiving elements of corresponding element rows; and
   a border that runs in a direction substantially parallel to the rows of light-receiving elements and includes a position corresponding to an optical axis of light incident from an image pickup lens disposed on the substrate, the border creating a left side region of the solid-state image pickup element and a right side region of the solid-state image pickup element;
   wherein the transfer paths and rows of light-receiving elements are positioned such that accumulated charges in a light-receiving element row on the left side region of the solid-state image pickup element are read-out by a transfer path disposed to the left of the light-receiving element row, and accumulated charges in a light-receiving element row on the right side region of the solid-state image pickup element are read-out by a transfer path disposed to the right of the light-receiving element row.

2. The solid-state image pickup element of claim 1, further comprising a charge separating layer that electrically separates the divisional regions along the border.

3. The solid-state image pickup element of claim 1, further comprising a transfer path along the border which does not have a corresponding element row.

4. An image pickup device, comprising:
   the solid-state image pickup element of claim 3;
   a generating unit generating image data on the basis of the amount of the charge of the respective light-receiving elements, transferred from the solid-state image pickup element; and
   a correcting unit carrying out correction which removes noise from the image data, on the basis of an amount of charge obtained from the transfer path which does not have a corresponding element row.

5. The solid-state image pickup element according to claim 1, further comprising a pixel-separating layer positioned between a light-receiving element row and a transfer path, which will not read out the accumulated charge from that light-receiving element row.

6. The solid-state image pickup element according to claim 1, wherein the plurality of light-receiving elements are arranged in a honeycomb form.

* * * * *